(12) United States Patent
Fromm et al.

(10) Patent No.: US 8,239,566 B2
(45) Date of Patent: Aug. 7, 2012

(54) NON-SATURATING FAIRNESS PROTOCOL AND METHOD FOR NACKING SYSTEMS

(75) Inventors: Eric C. Fromm, Eau Claire, WI (US); Gregory M. Thorson, Altoona, WI (US)

(73) Assignee: Silicon Graphics International, Corp., Fremont, CA (US)

( * ) Notice: Subject to any disclaimer, the term of this patent is extended or adjusted under 35 U.S.C. 154(b) by 1197 days.

(21) Appl. No.: 12/039,048

(22) Filed: Feb. 28, 2008

(65) Prior Publication Data

US 2009/0222821 A1 Sep. 3, 2009

(51) Int. Cl.
 G06F 15/16 (2006.01)
 G06F 15/167 (2006.01)
(52) U.S. Cl. ......... 709/235; 709/223; 709/225; 709/232
(58) Field of Classification Search .......... 709/223–226, 709/232–235, 240
See application file for complete search history.

(56) References Cited

U.S. PATENT DOCUMENTS

| | | | | |
|---|---|---|---|---|
| 4,897,833 A | * | 1/1990 | Kent et al. | 370/447 |
| 5,276,899 A | * | 1/1994 | Neches | 709/240 |
| 6,091,709 A | * | 7/2000 | Harrison et al. | 370/235 |
| 7,206,593 B1 | * | 4/2007 | Yarkosky et al. | 455/517 |
| 2003/0103527 A1 | * | 6/2003 | Beser | 370/468 |
| 2003/0135639 A1 | * | 7/2003 | Marejka et al. | 709/232 |
| 2005/0041597 A1 | * | 2/2005 | Wang et al. | 370/252 |
| 2005/0086439 A1 | * | 4/2005 | Kaczynski | 711/151 |
| 2007/0005768 A1 | * | 1/2007 | Won et al. | 709/225 |
| 2007/0143290 A1 | * | 6/2007 | Fujimoto et al. | 707/9 |
| 2007/0263650 A1 | * | 11/2007 | Subramania et al. | 370/412 |
| 2012/0030326 A1 | * | 2/2012 | Cassidy et al. | 709/223 |

* cited by examiner

*Primary Examiner* — Brendan Higa

(74) *Attorney, Agent, or Firm* — Sunstein Kann Murphy & Timbers LLP

(57) ABSTRACT

Processing transaction requests in a shared memory multiprocessor computer network is described. A transaction request is received at a servicing agent from a requesting agent. The transaction request includes a request priority associated with a transaction urgency generated by the requesting agent. The servicing agent provides an assigned priority to the transaction request based on the request priority, and then compares the assigned priority to an existing service level at the servicing agent to determine whether to complete or reject the transaction request. A reply message from the servicing agent to the requesting agent is generated to indicate whether the transaction request was completed or rejected, and to provide reply fairness state data for rejected transaction requests.

30 Claims, 3 Drawing Sheets

NON-SATURATING FAIRNESS PROTOCOL AND METHOD FOR NACKING SYSTEMS

FIELD OF THE INVENTION

The present invention relates to computer network resources, and more specifically to allocation of such resources between competing network entities.

BACKGROUND ART

In multi-processor computer systems, tasks between the processors can be divided between the available processors and network resources. Shared address memory systems let the processors access common system memory. Local cache memory can also provide fast access to data for local processing tasks. The cache typically keeps copies of data from memory local to a number of other processor nodes.

As multi-processor systems get larger, the number of transaction requests from requesting agents to servicing agents also increases, and the system can become congested with message and data traffic. Larger systems can also suffer from request starvation when the length of time for servicing the transaction requests grows too long. There can also be problems with servicing requests "fairly" so as to optimize system performance.

A request priority system can assign priorities to transaction requests. This may also include a mechanism to deal with excessive negative acknowledgements (NACKs) from the servicing agents indicating that specific transaction requests cannot yet be serviced. In response to a NACK, a requesting agent may re-transmit another request for the service. The request priority may be a step function based on the number of NACKs received.

Such systems can tend to produce an excessive number of NACKed requests, which result in requests being re-injected back into the system. And previous such schemes did not ultimately guarantee starvation avoidance because conditions could arise where many contending requests have a saturated priority and thus all fairness of service ordering between them is lost. In addition, there was no persistence of fairness related state at the servicing agent between successive servicing actions—the service level was reset at the beginning of each servicing action and a new service level was determined to be the highest priority of any request rejected while that servicing action was under way—the target cache line was busy. Further, prior systems did not have nor need provisions for ensuring the forward progress of probe actions (required for managing system-wide data coherency) which contend for access to the processor domain or to intermediate shared resources (proxy agents). Nor did they deal with congestion related issues. Prior schemes had yet another problem—they relied on retry counts for determining request priority. This policy tended to promote more rapid accumulation of priority for requests originating from nearby requesting agents and was thus not an objective means of determining relative priority between contending requests.

SUMMARY OF THE INVENTION

Method of Processing Transaction Requests

Embodiments of the present invention are directed to a method of processing transaction requests in a shared memory multi-processor computer network. A transaction request is received at a servicing agent from a requesting agent. The transaction request includes a request priority associated with a transaction urgency determined by the requesting agent. The servicing agent provides an assigned priority to the transaction request based on the request priority, and then compares the assigned priority to an existing service level at the servicing agent to determine whether to complete or reject the transaction request. A reply message from the servicing agent to the requesting agent is generated to indicate whether the transaction request was completed or rejected, and to provide reply fairness state data for rejected transaction requests.

For example, the reply fairness state data may include a retry delay specification for delaying generation of a retry transaction request for later performance of the rejected transaction request. Specifically, the retry delay specification may reflect a difference between the assigned priority of the transaction request and the existing service level when the reply message was generated. In addition, the retry delay specification may be shorter when the assigned priority of the rejected transaction request is higher.

Further specific embodiments maintain contention-related statistics concerning outstanding transaction requests for each assigned priority, and based on the contention-related statistics, the service level is determined. The contention-related statistics are continuously updated as transaction requests are completed or rejected in order to dynamically adjust the service level and other aspects of fairness related behavior. Embodiments may also register a transaction request associated with the contention-related statistics, and include registration information in the reply fairness state data to be echoed back to the servicing agent in a subsequent retry transaction request. In specific embodiments, the transaction request may be checked for registration information echoed from a previous transaction reply so as to avoid re-registering the transaction request a second time. Previous transaction request registrations and associated contention-related statistics may periodically be invalidated so that incoming registered transaction requests are subject to re-registering regardless of prior registration state so as to provide resilient operation accounting for dropping of registered transaction requests. This may involve distinguishing a transaction request registered prior to the current registration period from a transaction request registered during the current registration period. Accordingly, the reply fairness state data may include a registration period flag that reflects the registration period of the transaction request. In addition or alternatively, the transaction request may include a do not register flag instructing the servicing agent to not register the transaction request because the requesting agent might not retry the transaction request if rejected by the servicing agent.

Specific embodiments may also set the assigned priority to be less than the request priority so as to avoid priority saturation. The transaction urgency at the requesting agent may be a function of age reflecting time elapsed since initiating the original transaction request, and the reply fairness state data may include a direction to the requesting agent to freeze the transaction urgency (additional accumulation of transaction urgency) for a given transaction request so as to avoid subsequent priority saturation. The retry transaction request may include a priority upgrade requested flag identifying when the previous assigned priority for that transaction request is lower than its transaction urgency.

System for Processing Transaction Requests

Embodiments of the present invention also include a system for processing transaction requests in a shared memory multi-processor computer network. A request pre-processor in a servicing agent receives a transaction request from a requesting agent. The transaction request includes a request priority associated with a transaction urgency level determined by the requesting agent. The transaction request is provided an assigned priority determined by the servicing agent based on the request priority. A service processing module compares the assigned priority to an existing service level to determine whether to complete or reject the transaction request, and generates a reply message to the requesting agent. A fairness state logic within the service processing module responds to a transaction request having an assigned priority below the service level by rejecting the transaction request, and includes reply fairness state data in the rejection reply message.

In further specific embodiments, a contention-related statistics module maintains contention-related statistics concerning outstanding transaction requests for each assigned priority, and the existing service level may be determined based on the contention-related statistics. The fairness state logic may include in the reply fairness state data a retry delay specification for delaying generation of a retry transaction request for later performance of the rejected transaction request. For example, the retry delay specification may reflect a difference between the assigned priority of the transaction request and the existing service level when the reply message was generated. In addition or alternatively, the retry delay specification may be shorter when the assigned priority of the rejected transaction request is higher.

A specific embodiment may also include a registration module for registering a transaction request associated with the contention-related statistics, wherein the reply fairness state data includes registration information to be echoed back to the servicing agent in a subsequent retry transaction request. The registration module may check the transaction request for registration information from a previous transaction request so as to avoid re-registering the transaction request a second time. The registration module also may periodically invalidate all previous transaction request registrations and associated contention-related statistics so that incoming registered transaction requests are subject to re-registering regardless of prior registration state so as to provide resilient operation accounting for dropping of registered transaction requests. Further, the registration module may distinguish a transaction request registered prior to the current registration period from a transaction request registered during the current registration period, and the fairness state logic may include in the reply fairness state data a registration period flag that reflects the registration period of the transaction request.

In specific embodiments, the transaction request may include a do not register flag instructing the registration module to not register the transaction request because the requesting agent might not retry the transaction request if rejected by the servicing agent. The request pre-processor may assign the assigned priority to be less than the request priority so as to avoid priority saturation. The transaction urgency at the requesting agent may be a function of age reflecting time elapsed since initiating the original transaction request. The fairness state logic may include in the reply fairness state data a direction to the requesting agent to freeze accumulation of the transaction urgency for a given transaction request so as to avoid priority saturation. The fairness state logic may include in the reply fairness state data a reply priority to be echoed in a corresponding retry transaction request so that the servicing agent is not required to maintain that information itself. The retry transaction request may include a priority upgrade requested flag identifying when the previous assigned priority for that transaction request is lower than its transaction urgency.

DETAILED DESCRIPTION OF SPECIFIC EMBODIMENTS

Definitions. As used in this description and the accompanying claims, Appendix 1 at the end of the Detailed Description sets forth the meanings of the terms listed therein, unless the context otherwise requires.

Figure 1:
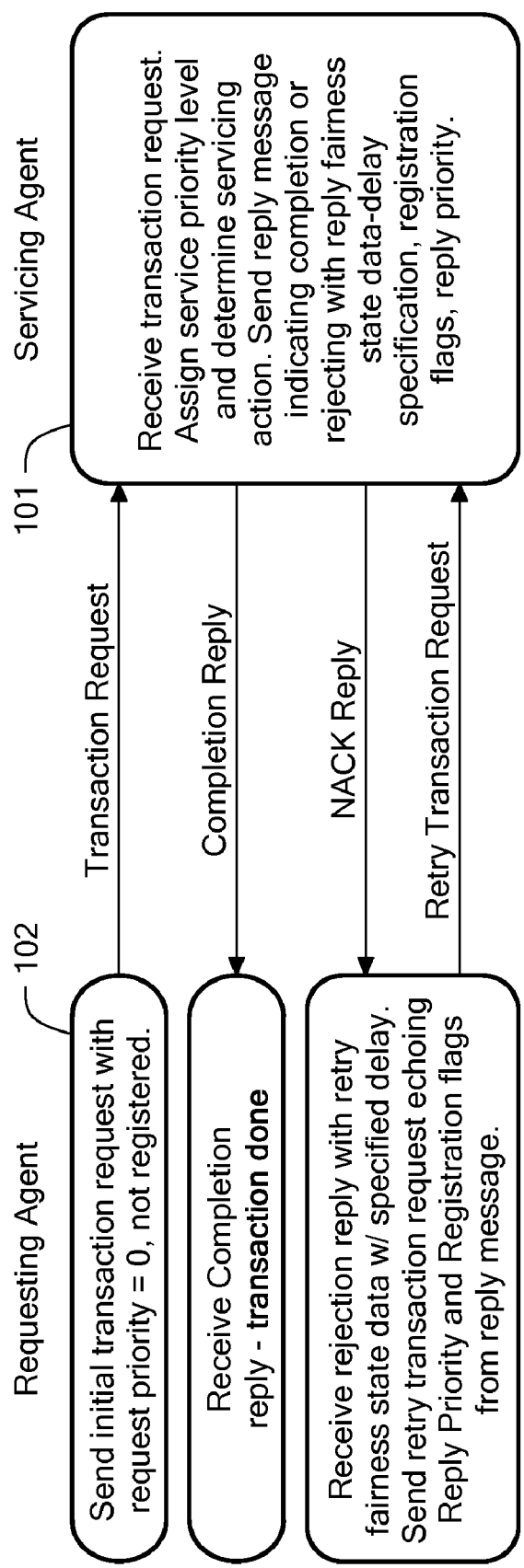
FIG. 1 illustrates operation of an embodiment of the present invention.

Embodiments of the present invention are directed to a fairness protocol for shared memory multi-processor computer networks. FIG. 1 illustrates operation in which a Servicing Agent 101 receives a transaction request over the network from a Requesting Agent 102 (one of multiple such Servicing Agents and transaction requests associated with operation of the network). The initial transaction request is for a service from the Servicing Agent 101 and includes an associated request priority based on the initial transaction urgency at the Requesting Agent 102, which in the first instance may typically be set to 0. The Servicing Agent 101 then provides to the transaction request an assigned priority that is based on the request priority in the incoming message and other factors such as how busy it is and how many other contending transaction requests it needs to address. Based on the assigned priority that it assigns to the transaction request, the Servicing Agent 101 determines whether to complete or reject the request. If the requested action is performed, the Servicing Agent 101 sends a completion reply message back to the Requesting Agent 102. If the request is not performed, the Servicing Agent 101 rejects the transaction request and sends the Requesting Agent 102 a rejection message (e.g., a NACK message) which includes reply fairness state data so that Requesting Agent 102 can try again later.

For example, in one specific embodiment, the reply fairness state data includes a reply priority and a retry delay specification for rescheduling the transaction request. The retry delay specification may specifically reflect a difference between the reply priority and the service level existing at the Servicing Agent 102 when the reply message is generated. In a further such embodiment, the retry delay specification may be shorter when the assigned priority is higher. Reply priority may be provided by the Servicing Agent 101 in the reply fairness state data to be echoed in a corresponding retry transaction request so that the Servicing Agent 101 need not track and maintain such information itself. In one specific embodiment, a priority upgrade requested flag can be used in a retry transaction request to identify when the reply priority set by the Servicing Agent 101 is lower than the current age-based transaction urgency of that transaction request within the Requesting Agent 102. Moreover, the reply fairness state data can be used as a mechanism for avoiding priority saturation by suspending the priority aging process—"priority freezing"—providing a guarantee of eventual forward progress. If the Requesting Agent 102 determines that it needs higher priority servicing (e.g., according to its transaction urgency), it will assert a priority upgrade flag in a subsequent transaction request, which may or may not be granted by the Service Agent depending on if a priority freeze is in effect.

This approach to fairness handling at the Servicing Agent 101 addresses a number of service issues related to system performance and forward progress in the face of contention for shared system resources. These issues include without limitation starvation avoidance (forward progress), fairness of service delivery, wasted or under utilized resources, and collateral performance penalties on unrelated processes. Only modest amounts of state and signaling are needed for the Servicing Agent 101 and the Requesting Agent 102 to coordinate fairness related behavior for transaction requests. In addition, transaction urgency accumulation is age-related so that the transaction urgency of a transaction request is a function of time elapsed from the original transaction request. Moreover, the service level does not retreat to a lower value if the Servicing Agent 101 has registered transaction requests still pending at an assigned priority corresponding to the existing service level. Persistent service level tracking reduces opportunities for mis-ordered servicing of contending transaction requests. Retry scheduling is improved because processing of rejection reply messages at the Requesting Agent 102 can be incrementally delayed (e.g., by the scheduling delay specification) which reduces unproductive traffic associated with less urgent (ultimately rejected) transaction request attempts, thereby facilitating the rapid servicing of older contending transaction requests.

Figure 2:
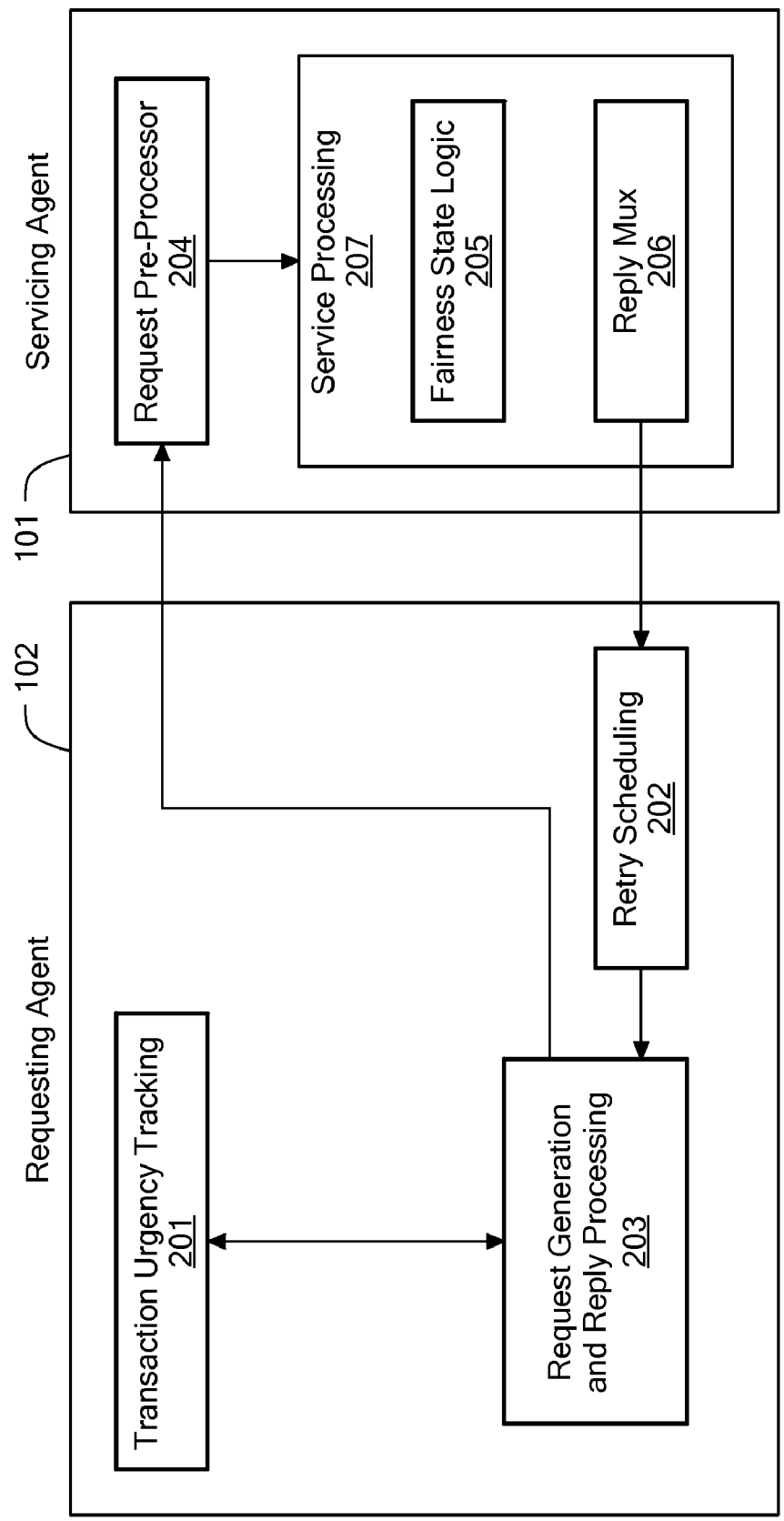
FIG. 2 provides further detail regarding partitioning of fairness-related functionality in embodiments of the present invention.

FIG. 2 shows partitioning of fairness-related functionality where Requesting Agent 102 tracks an internal value of transaction urgency 201 which is initially used as the request priority in an initial outgoing transaction request. Incoming rejection replies are intercepted by retry scheduler 202 before being delivered to request generation and reply processing block 203. This delays generation of retry transaction requests to the network and reduces congestion at Servicing Agent 101 and in the network generally. The amount of delay to be applied to a given retry action is specified in the rejection reply message returned by Servicing Agent 101. Retry scheduling 202 can be thought of as basically a black box that receives incoming rejection reply messages with a delay specification, and forwards delayed rejection reply messages after the required amount of delay has elapsed. An outgoing retry transaction request message request from the generation and reply processing block 203 echoes the assigned reply priority provided by the rejection message. If the reply priority is less than the transaction urgency 201, then an upgrade request flag may also be set.

At Servicing Agent 101, an incoming transaction request is received by request pre-processing block 204, which provides to the transaction request an assigned priority determined based on the request priority and various other factors. Service processing logic 207 compares the assigned priority to the existing service level in the fairness-specific logic 205 that maintains service level or other fairness state information (e.g., starvation control buffers (SCBs) discussed further below) in order to determine whether to complete or reject the transaction request. Incoming transaction requests that are accepted for service are passed along by the service processing logic 207 for servicing by the request resource. Transaction requests having an assigned priority less than the service level in the fairness-specific logic 205 are rejected. In addition, the fairness state is updated according to the information in the transaction request message. Reply multiplexer 206 generates a reply message back to the Requesting Agent 102 indicating either that the transaction request was completed, or that it was rejected and providing fairness state data for retrying the transaction request.

When Requesting Agent 102 issues a transaction request message, specific embodiments may insert various supplemental information into the message header, including information related to rejection and rescheduling. Similarly, when a reply message issues, auxiliary information may be taken from the incoming transaction request message to be inserted in the reply message by reply multiplexer 206. That information may be used, for example, to update the service level (state of the starvation control buffer, SCB) and to format the fairness related content of the outgoing reply message headers.

Figure 3:
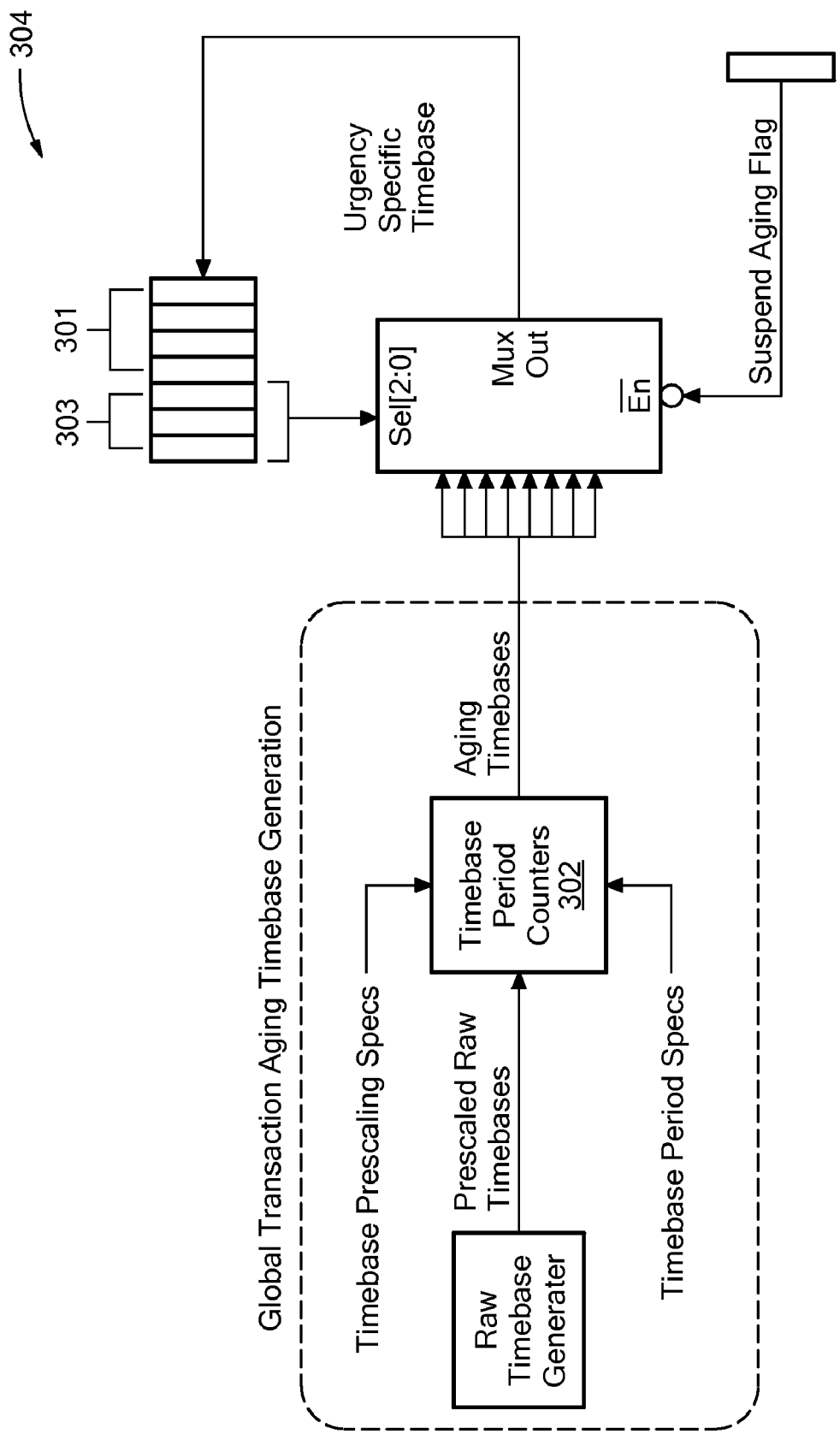
FIG. 3 illustrates aspects of a transaction aging time as may be used in various embodiments.

Requesting agent 102 may track the age of each of its transaction requests. As shown in FIG. 3, a specific embodiment may use a 4-bit transaction aging timer 301 which is updated with each tick of a global (chip-wide) aging timebase 302. The aging timebase 302 for each transaction urgency value 303 may be specified separately with different frequencies (e.g., from 50 MHz down to 0.1 Hz). The transaction urgency value 303 can increment to the next level as the transaction aging timer 301 rolls over to begin the next aging period. The aging timer 301 and transaction urgency value 303 may be specifically implemented as adjacent fields of a 7-bit counter 304. When an initial transaction request first issues, it may be assigned a tracking resource of some sort, which may include the transaction aging timer 301 and transaction urgency value 303. These may all be initially reset as the Requesting Agent 102 first initiates messaging for that transaction and an appropriately initialized request message issues. From that point on, the aging timer 301 accumulates age continuously.

Servicing Agent 102 attempts to provide fair access to its resources in the face of heavy contention and so may implement at least one general access starvation control buffer (SCB). In some cases (e.g., for servicing memory directed requests), multiple serial access SCBs may be used to minimize the collateral impact of contention for a given target resource on transaction requests targeting other unrelated resources (e.g., for different memory addresses). Serial access SCBs can be implemented as an allocated pool of shared resources, and an arbitration SCB may be useful to manage fair sharing access to the pool of serial access SCBs. Each SCB entry may maintain a registration count of registered transaction requests rejected for each service level above zero. A preempt service flag may be associated with each count indicating when requests at a lower assigned priority must be preemptively rejected. The preempt service flag is set and clear according to the current value of the associated registration count and preemption configuration registers In addition, serial access SCBs may also include an "SCB-allocated" flag for allocation management and an address tag to identify the target to which it is allocated.

A set of programmable control and status registers (CSRs) may be associated with the SCB structures which initialize and tune various operation parameters such as:

Registration Color—used to distinguish between old (stale) registrations and fresh ones. (Generally controlled by hardware action).

Registration Count High and Low Preemption levels—defines when to set and clear the preempt service flags.

Priority Freezing Point—defines a threshold of service levels below which a priority freeze is applied.

Suspend Aging Threshold—defines a threshold below which aging is suspended.

The notion of a service level is implicit in the use of preempt service flags. For example, the service level may be defined to be that associated with the highest priority preempt service flag that is currently asserting. So if preempt service flags for priorities 2, 4, and 5 are currently asserting, then the service level is at 5 and all requests at priority 4 and lower will be rejected.

Regardless of SCB type, SCB related logic typically provides various services such as:

- Tracks the number of contending transaction requests that did not receive service at each assigned priority above 0.
- Identifies which arriving transaction requests will be pre-emptively rejected for fairness and forward progress related reasons
- Controls the accumulation of assigned priority associated with incoming transaction requests in order to avoid the deleterious effects of priority saturation
- Controls the retry rate of contending transaction requests based on incoming assigned priority and current assigned priority.

When an incoming transaction request arrives at Servicing Agent 101, it is tested against various rejection criteria. For example, there may be fairness related criteria which may reject the request if the transaction request is not registered and if at the time only registered transactions are being serviced (because critical fairness related resources are fully subscribed—congestion). Or the current service level may be higher than the assigned priority of the current transaction request. There may also be resource availability related criteria, which can reject a transaction request when no allocatable servicing resource, transaction buffer, or similar is available or if the target end point is otherwise not available, for example, is in a coherence protocol related (busy) state.

Servicing Agent 101 may take various specific fairness related actions, including, for example, to register or de-register a transaction request, upgrade the assigned priority of a transaction request, freeze the assigned priority of a transaction request, or force a re-registration. An unregistered transaction request is typically registered at the assigned priority that will be returned in the outgoing rejection reply; in addition, a registration count associated with that assigned priority will be incremented. A registration can be preempted if the target registration count is maxed out or if new registrations are disallowed due to congestion (SCB's not available). Registration for a successfully serviced transaction request is closed out and that transaction request is de-registered (the registration count associated with the serviced transaction request priority is decremented).

The assigned priority for any transaction request (whether or not it is registered) can be upgraded by one level (e.g., in the assigned priority of a rejection message) if the priority upgrade flag was asserted in an incoming transaction request message. An upgrade for a transaction request is denied when a priority freeze is in effect. An upgrade for a registered transaction request can also be disallowed if the registration count of the target priority is maxed out. And an upgrade for a registered transaction request may also need a de-registration action in which the registration count for the current request priority is decremented. A priority freeze may be asserted based on programmable service level values and applied against individual transaction requests depending on their priority, whether they are already registered or not, and if so, what type of registration.

Fairness registration can ensure eventual service for a transaction request. But registration may not be an absolute requirement for gaining service. Under normal circumstances of no contention, and even when there is some moderate contention, an un-registered transaction request may gain service simply if its assigned priority is high enough.

Without preempt service flags the assigned priority might be based on a fixed threshold value of the registration counts. For example, a threshold of 1 (an otherwise unlikely choice) would mean that the assigned priority is the highest one for which its registration count is non-zero. With preempt service flags, a different threshold can be set for each individual assigned priority, and a hysteresis effect can be added by having different high and low preempt service flag thresholds. In addition, preempt service flags may be useful for managing new registrations—an unregistered transaction request may be registered only if the preempt service flag at the target registration priority is not asserted.

It is useful to consider situations where a retrying transaction request is contending for a resource that is not the final target endpoint, and thus it may subsequently have to contend for service at one or more intermediate Servicing Agents (i.e., proxy agents). When it is initially serviced at a non-endpoint agent, an incoming transaction request is essentially converted into an outgoing request targeting a resource at a next Servicing Agent in the chain. To continue the aging process and thus sustain overall guarantees of forward progress, this intermediate outgoing transaction request should therefore carry the already accumulated assigned priority of the associated incoming transaction request. The registration indication in the outgoing transaction request header should be cleared initially so that the transaction request can be registered for appropriately urgent service at the next Servicing Agent as necessary. Thus the aging process and the accumulation of assigned priority can continue unabated to final completion of the transaction request without resetting at the intermediate steps along the way (in other words, adding does not start all over again at each intermediate agent).

Requesting Agent 102 may ask for a priority upgrade whenever an assigned priority is below the associated transaction urgency for a given transaction request. This may be done by asserting the priority upgrade flag in the next retry transaction request issued by Requesting Agent 102. Normally, when that transaction request is received by Servicing Agent 101, it will increment the assigned priority it received by one, and return that value as the assigned priority in the subsequent rejection reply. However, the request for a priority upgrade will be ignored at Servicing Agent 101 if a priority freeze is in effect (e.g., based on current service levels) or if the transaction request has been registered but the upgrade is disallowed due to a saturated registration counter at the upgraded assigned priority.

Two values may be specified via priority threshold CSRs. One is the assigned priority threshold at which priority freezing is in effect. The other is the assigned priority threshold at which transaction aging is suspended. When the current assigned priority is higher than a specified threshold value, the behavior associated with that threshold is tentatively enabled. The behavior (priority freeze or aging suspension) may only actually be applied to transaction requests whose incoming request assigned priority is at or below the current assigned priority.

Re-registration can be forced by toggling the current registration color flag in a registration control CSR. This may occur automatically as the current registration period (tracked in the registration timer) expires. Subsequently, incoming transaction requests registered in the old color must be re-registered in the new color if they can not be immediately serviced—the old registration is ignored.

Embodiments of the invention may be implemented in any conventional computer programming language. For example, preferred embodiments may be implemented in a procedural programming language (e.g., "C") or an object oriented programming language (e.g., "C++", Python). Alternative embodiments of the invention may be implemented as preprogrammed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

APPENDIX 1

Service Completion Reply—A network message signaling that a transaction request has been satisfied.

Service Rejection Reply—A network message signaling that a transaction request has been rejected (usually a NACK message).

Transaction Request—The overall network request/reply/retry messaging activity involved in producing an initial Service Completion Reply.

Requesting Agent—An entity that initiates transaction requests

Request Resource—Dedicated state at the Requesting Agent used to track the progress of a given transaction request.

Servicing Agent—An entity that services transaction requests.

Servicing Resource—Dedicated state at the Servicing Agent used to track the progress of a given transaction request.

Transaction Urgency—An age-based value representing time elapsed since a transaction request issued at the Requesting Agent. For example, the Request Priority delivered in a transaction request may be derived from the age-based Transaction Urgency.

Request Priority—A value determined at the Servicing Agent representing the level of servicing priority assigned to the associated transaction request. This may be derived from but not necessarily equal to Transaction Urgency.

Reply Priority—A Servicing Agent dictates the next value of the Request Priority by providing it in network NACK messages as the Reply Priority.

Priority Upgrade—If the priority of a transaction request corresponds to a higher priority than that returned in a NACK message, the next request message for that transaction request may carry an indication of that fact (an asserted Priority Upgrade flag). The Servicing Agent will then adjust Registration Counts and resulting Reply Priority accordingly.

Service Starvation—Lack of forward progress due to continuous rejection of transaction requests.

Priority Saturation—The maximum possible priority value. Once priority reaches this value for multiple contending transaction requests, no further distinction of priority between those transaction requests is possible.

Sustained Saturation—If priority is allowed to accumulate as contention for resources and network congestion rise, it may be possible under certain circumstances to reach a state where younger transaction requests reach priority saturation at a rate that is equal to or exceeds the rate at which such transaction requests can be serviced. In those cases, it is then possible that some transaction requests will not receive service before the Requesting Agent times out.

Priority Freeze—The temporary suspension of priority upgrades. A means to avoid sustained priority saturation The Servicing Agent simply returns an unmodified copy of the Request Priority in the resulting NACK reply message when a Priority Freeze is in effect.

Transaction Registration—A transaction request that cannot be serviced immediately is "registered" at the Servicing Agent according to its priority. That agent then takes steps to ensure that a subsequent request retry will eventually gain access. Note that registration is NOT a prerequisite for gaining service. It is actually more a means to collect statistics used to adjust various parameters of operation in order to promote fairness and reduce the likelihood of starvation. However, under extreme conditions when starvation is apparent, transaction registration does provide an absolute guarantee of eventual service.

Registration Count—The act of registering a transaction request at the Servicing Agent involves incrementing a counter at a value related to the priority carried in the request message. Later, when the registered transaction request is successfully serviced, that counter will be correspondingly decremented.

Registration Type—When multiple types of contention are individually managed via separate types of Starvation Control Buffers (SCBs), the Registration Type distinguishes between them:

Not Registered at all.
Registered in an General Access SCB.
Registered in an Serial Access SCB.
Registered in an Arbitration SCB.

This value is supplied along with other registration indications in reply messages generated by the Servicing Agent and subsequently copied into retry request messages by the Requesting Agent.

Registration Color—There are two Registration Colors, red and black. They provide the means to distinguish between stale registrations and fresh registrations. A Servicing Agent will periodically switch colors and re-register transaction requests using the new registration color. A transaction request registered in the non-current color is considered to be not registered at all. This adds a degree of robustness to the UV registration paradigm in the face of lost or dropped messages.

Registration Period—The duration of time successive alternations of the Registration Color at the Servicing Agent. On the order of hundreds of milliseconds to multiple seconds.

Service Level—A value tracked at the Servicing Agent representing the minimum priority that an incoming transaction request must have in order to be considered for service.

Preempt service flag—Associated with a given Registration Count, a Preempt service flag asserts when the corresponding count reaches a specified high threshold and de-asserts when it drops back down to a separately specified low threshold. Used for two distinct purposes:
 Determining the current Service Level
 Determining whether an unregistered transaction request will be registered, and if so, at what priority.

Fairness Tracking Resource—Transaction registration state and logic used to arbitrate between transaction requests contending for the same servicing resources; e.g., Starvation Control Buffers (SCBs).

General Contention for a Resource—General contention for access where servicing resources are limited. Multiple concurrent transaction requests may be serviced through those resources at any point in time. Contention is managed via a single General Access SCB.

Target Specific Contention for Serialized Access—Contention related to isolating the effects of contention for access to one target from unrelated accesses to other targets which happen to funnel through a common point of access. Only one access is active to that specific target at any point in time. In general, contention is arbitrated on a per-address basis and multiple Serial Access SCBs are made available to facilitate the desired isolation. The Servicing Agent might reserve a Servicing Resource for each currently allocated Serial Access SCB so that transaction requests registered in a Serial Access SCB are never rejected due to lack of Servicing Resources.

General Contention for Registration in a Serial Access SCB—When a pool of Serial Access SCBs is implemented at the Servicing Agent, separate means are provided to arbitrate fairly for access to those resources as well. When a transaction request is rejected due to target specific contention, it needs to be registered in a Serial Access SCB. If that is not possible due to lack of allocatable SCBs or because of a freeze on new Serial Access registrations, a rejected transaction request will be instead registered in a separate, dedicated Arbitration SCB. The Arbitration SCB is used to gain access to the services provided by the Serial Access SCBs while a Serial Access SCB provides an arbitration service to gain access to a specific endpoint resource.

Priority and Urgency Propagation—When an incoming transaction request message produces one or more outgoing request messages, the priority of the incoming transaction request must be propagated into the outgoing messages. This ensures that all activity related to the eventual completion of the original transaction request vies for prerequisite services with an appropriate degree of urgency. Note that intermediate agents that must propagate priority must also initiate a matching aging process so that urgency accumulation and can continue unabated.

Scheduling Delay—The Servicing Agent will calculate an amount of time that should elapse before the Requesting Agent attempts to retry a rejected request. This value is supplied to the Requesting Agent in the supplemental field of a NACK reply message header.

Suspended Aging—An optional behavior allows the Servicing Agent to freeze not just Urgency Upgrades, but the aging process itself This is accomplished via the Suspend Aging flag set by the Servicing Agent in the NACK reply supplemental field. The Requesting Agent updates its local copy of this flag for a given transaction with each associated NACK reply which is then used to gate assertion of the Aging Timer time base input. The Servicing Agent will assert this flag for any NACKed reply based on the current Service Level, the Reply Priority of the NACK, and the Suspend Aging Threshold CSR value.

What is claimed is:

1. A method of processing transaction requests in a shared memory multi-processor computer network, the method comprising:
 receiving a transaction request at a servicing agent from a requesting agent, the transaction request including a priority request associated with a transaction urgency determined by the requesting agent;
 providing to the transaction request an assigned priority determined by the servicing agent based on the request priority;
 comparing the assigned priority to an existing service level at the servicing agent to determine whether to complete or reject the transaction request; and
 generating a reply message from the servicing agent to the requesting agent:
 i. indicating whether the transaction request was completed or rejected, and
 ii. providing reply fairness state data for rejected transaction requests, wherein the reply fairness state data includes a retry delay specification for delaying generation of a retry transaction request for later performance of the rejected transaction request.

2. A method according to claim 1, further comprising:
 maintaining contention-related statistics concerning outstanding transaction requests for each assigned priority;
 determining the service level based on the contention-related statistics; and
 continuously updating the contention-related statistics as transaction requests are completed or rejected in order to dynamically adjust the service level.

3. A method according to claim 1, wherein the retry delay specification reflects a difference between the assigned priority of the transaction request and the existing service level when the reply message was generated.

4. A method according to claim 1, wherein the retry delay specification is shorter when the assigned priority of the rejected transaction request is higher.

5. A method according to claim 2, further comprising:
 registering a transaction request associated with the contention-related statistics; and
 including registration information in the reply fairness state data to be echoed back to the servicing agent in a subsequent retry transaction request.

6. A method according to claim 5, wherein registering a transaction request includes checking the transaction request for registration information from a previous transaction request so as to avoid re-registering the transaction request a second time.

7. A method according to claim 6, further comprising:
 periodically invalidating all previous transaction request registrations and associated contention-related statistics so that incoming registered transaction requests are subject to re-registering regardless of prior registration state so as to provide resilient operation accounting for dropping of registered transaction requests.

8. A method according to claim 7, wherein periodically invalidating all previous transaction request registrations and associated contention-related statistics includes distinguishing a transaction request registered prior to the current registration period from a transaction request registered during the current registration period.

9. A method according to claim 8, wherein the reply fairness state data includes a registration period flag that reflects the registration period of the transaction request.

10. A method according to claim 5, wherein the transaction request includes a do not register flag instructing the servicing agent to not register the transaction request because the requesting agent might not retry the transaction request if rejected by the servicing agent.

11. A method according to claim 1, wherein the assigned priority may be assigned to be less than the request priority so as to avoid priority saturation.

12. A method according to claim 1, wherein the transaction urgency at the requesting agent is a function of age reflecting time elapsed since initiating the original transaction request.

13. A method according to claim 12, wherein the reply fairness state data includes a direction to the requesting agent to freeze the transaction urgency for a given transaction request so as to avoid subsequent priority saturation.

14. A method according to claim 1, wherein the reply fairness state data includes a reply priority to be echoed in a corresponding retry transaction request so that the serving agent is not required to maintain that information itself.

15. A method according to claim 14, wherein the retry transaction request includes a priority upgrade requested flag identifying when the previous assigned priority for that transaction request is lower than its transaction urgency.

16. A system for processing transaction requests in a shared memory multi-processor computer network, the system comprising:
   a request pre-processor, comprising at least one physical processor, in a servicing agent for:
   i. receiving a transaction request from a requesting agent, the transaction request including a request priority associated with a transaction urgency determined by the requesting agent, and
   ii. providing to the transaction request an assigned priority determined by the servicing agent based on the request priority;
   a service processing code for:
   i. comparing the assigned priority to an existing service level at the servicing agent to determine whether to complete or reject the transaction request, and
   ii. generating a reply message to the requesting agent; and
   a fairness state logic within the servicing processing code for:
   i. responding to a transaction request having an assigned priority below the service level by rejecting the transaction request, and
   ii. including reply fairness state data in the rejection reply message, wherein the fairness state logic includes in the reply fairness state data a retry delay specification for delaying generation of a retry transaction request for later performance of the rejected transaction request.

17. A system according to claim 16, further comprising:
   a contention-related statistics code for maintaining contention-related statistics concerning outstanding transaction requests for each assigned priority, wherein the existing service level is determined based on the contention-related statistics.

18. A system according to claim 16, wherein the retry delay specification reflects a difference between the assigned priority of the transaction request and the existing service level when the reply message was generated.

19. A system according to claim 16, wherein the retry delay specification is shorter when the assigned priority of the rejected transaction request is higher.

20. A system according to claim 17, further comprising:
   a registration code for registering a transaction request associated with the contention-related statistics;
   wherein the reply fairness state data includes registration information to be echoed back to the servicing agent in a subsequent retry transaction request.

21. A system according to claim 20, wherein the registration code further checks the transaction request for registration information from a previous transaction request so as to avoid re-registering the transaction request a second time.

22. A system according to claim 21, wherein the registration code further periodically invalidates all previous transaction request registrations and associated contention-related statistics so that incoming registered transaction requests are subject to re-registering regardless of prior registration state so as to provide resilient operation accounting for dropping of registered transaction requests.

23. A system according to claim 22, wherein the registration code distinguishes a transaction request registered prior to the current registration period from a transaction request registered during the current registration period.

24. A system according to claim 23, wherein the fairness state logic includes in the reply fairness state data a registration period flag that reflects the registration period of the transaction request.

25. A system according to claim 20, wherein the transaction request includes a do not register flag instructing the registration code not to register the transaction request because the requesting agent might not retry the transaction request if rejected by the servicing agent.

26. A system according to claim 16, wherein the request pre-processor may provide the assigned priority to be less than the request priority so as to avoid priority saturation.

27. A system according to claim 16, wherein the transaction urgency at the requesting agent is a function of age reflecting time elapsed since initiating the original transaction request.

28. A system according to claim 27, wherein the fairness state logic includes in the reply fairness state data a direction to the requesting agent to freeze the transaction urgency accumulation for a given transaction request so as to avoid priority saturation.

29. A system according to claim 16, wherein the fairness state logic includes in the reply fairness state data a reply priority to be echoed in a corresponding retry transaction request so that the servicing agent is not required to maintain that information itself.

30. A system according to claim 29, wherein the retry transaction request includes a priority upgrade requested flag identifying when the previous assigned priority for that transaction request is lower than its transaction urgency.

* * * * *